United States Patent
Sumiyoshi et al.

(10) Patent No.: US 7,130,939 B2
(45) Date of Patent: Oct. 31, 2006

(54) CONTROLLING AND MANAGING PLURALITY OF DISK DRIVES IN DISK ENCLOSURE HAVING SERIAL PORT WHEREIN SERIAL TO PARALLEL CONVERTERS ARE CONNECTED TO INDIVIDUAL DISK DRIVES

(75) Inventors: Tohru Sumiyoshi, Yokohama (JP); Yoshihiro Fujie, Kanagawa-ken (JP); Makio Mukai, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/292,052

(22) Filed: Nov. 12, 2002

(65) Prior Publication Data

US 2003/0093586 A1 May 15, 2003

(30) Foreign Application Priority Data

Nov. 13, 2001 (JP) .............................. 2001-347320

(51) Int. Cl.
*G06F 3/06* (2006.01)
*G06F 13/00* (2006.01)
*H04N 5/781* (2006.01)

(52) U.S. Cl. .............................. 710/71; 710/1; 710/74; 710/72; 710/305; 386/125; 386/126; 386/46; 711/111; 711/112; 711/113; 711/114

(58) Field of Classification Search ................. 710/33, 710/52, 65, 69–71, 72, 74, 1, 305; 711/100, 711/111–114, 117, 4, 170; 386/125, 46, 126
See application file for complete search history.

(56) References Cited

U.S. PATENT DOCUMENTS 4,494,215 A * 1/1985 Koike et al. ................. 711/114

| 4,507,693 | A | * | 3/1985 | Matsuda et al. ........... 360/72.2 |
| 5,675,446 | A | * | 10/1997 | Kosugi et al. ................ 360/27 |
| 5,740,142 | A | * | 4/1998 | Nishiyama et al. ........... 369/59 |
| 5,822,144 | A | * | 10/1998 | Takahashi ..................... 360/67 |
| 5,838,891 | A | * | 11/1998 | Mizuno et al. ................ 714/5 |
| 6,185,368 | B1 | * | 2/2001 | Iwasaki et al. ............. 386/125 |
| 6,199,122 | B1 | * | 3/2001 | Kobayashi ................... 710/36 |
| 6,201,658 | B1 | * | 3/2001 | Maki ........................... 360/75 |

(Continued)

FOREIGN PATENT DOCUMENTS

JP           03-085660           4/1991

(Continued)

OTHER PUBLICATIONS

Serial communications interface, http://whatis.techtarget.com/definition/0,,sid9_gci962055,00.html, 1 page (p. 1 of 3).*

*Primary Examiner*—Tammara Peyton
(74) *Attorney, Agent, or Firm*—Dillon & Yudell LLP (57) ABSTRACT

A disk enclosure is provided with a plurality of HDDs, an enclosure manager that outputs control and management information of the disk enclosure, and S/P converters that are provided for the respective HDDs. Each S/P converter converts a control and management command outputted from the HDD in the form of a parallel signal into a serial signal and outputs it to the enclosure manager. Further, each S/P converter converts control and management information outputted from the enclosure manager into a parallel signal. With this configuration, merely providing a serial port in the enclosure manager and connecting the S/P converters to the enclosure manager by a serial bus can make the SES function of the ESI scheme effective for the HDDs.

14 Claims, 6 Drawing Sheets

U.S. PATENT DOCUMENTS

| | | | |
|---|---|---|---|
| 6,401,149 B1 * | 6/2002 | Dennin et al. | 710/58 |
| 6,425,033 B1 * | 7/2002 | Conway et al. | 710/305 |
| 6,594,739 B1 * | 7/2003 | Walton et al. | 711/155 |
| 6,671,789 B1 * | 12/2003 | He et al. | 711/170 |
| 6,697,891 B1 * | 2/2004 | Emberty et al. | 710/65 |
| 2002/0024753 A1 * | 2/2002 | Uno | 360/45 |
| 2002/0144046 A1 * | 10/2002 | Hooper, III | 710/316 |

FOREIGN PATENT DOCUMENTS

| | | |
|---|---|---|
| JP | 05-128040 | 5/1993 |
| JP | 08-263225 | 10/1996 |
| JP | 2000-215151 | 8/2000 |
| JP | 2003-036126 | 2/2003 |

* cited by examiner

CONTROLLING AND MANAGING PLURALITY OF DISK DRIVES IN DISK ENCLOSURE HAVING SERIAL PORT WHEREIN SERIAL TO PARALLEL CONVERTERS ARE CONNECTED TO INDIVIDUAL DISK DRIVES

This application claims the priority of Japanese Patent No. JP2001-347320 (IBM Docket No. JP920010258JP1), filed on Nov. 13, 2001, and entitled "Disk Enclosure and Disk Storage".

BACKGROUND OF THE INVENTION

1. Technical Field

The present invention relates to a disk enclosure having large data storage capacity, and more particularly to a large capacity disk enclosure that is capable of performing management properly and easily.

2. Description of the Related Art

Figure 7:
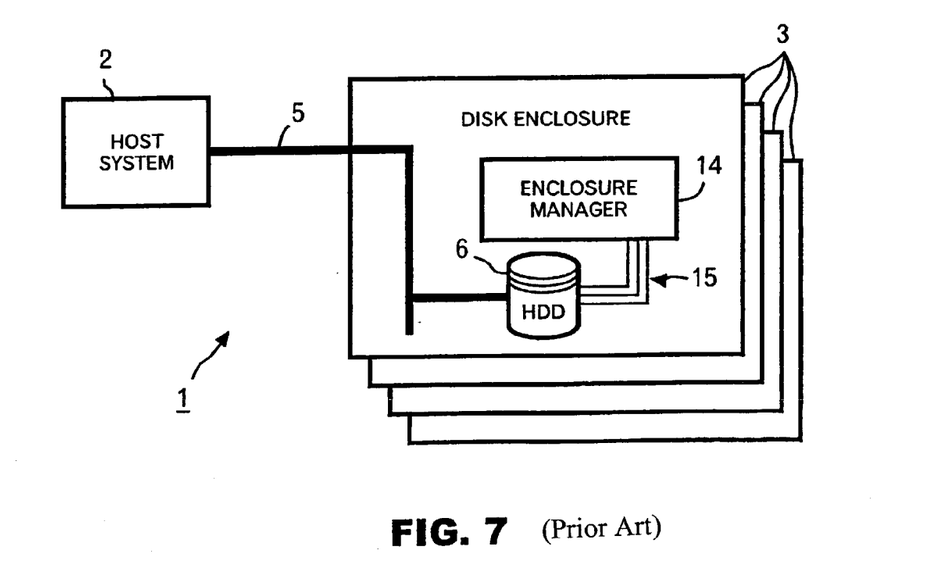
FIG. 7 is a diagram showing the overall configuration of a conventional data storage system.

Information storage devices are typically required to have large storage capacity and to allow high-speed access. It is also desired that they allow stored data to be shared by users at remote places. With respect to these requirements, a data storage system 1, schematically shown in FIG. 7, is employed as an information storage system. The data storage system 1 shown in FIG. 7 includes a host system 2, one or more disk enclosures 3, and FC-AL (Fibre Channel-Arbitrated Loop) 5 connected to the host system 2. Each disk enclosure 3 includes a plurality of hard disk drives (HDDs) 6 that function as nodes of the FC-AL 5. In FIG. 7, for the sake of simplicity, only one HDD 6 is shown and the other HDDs 6 are omitted.

Figure 8:
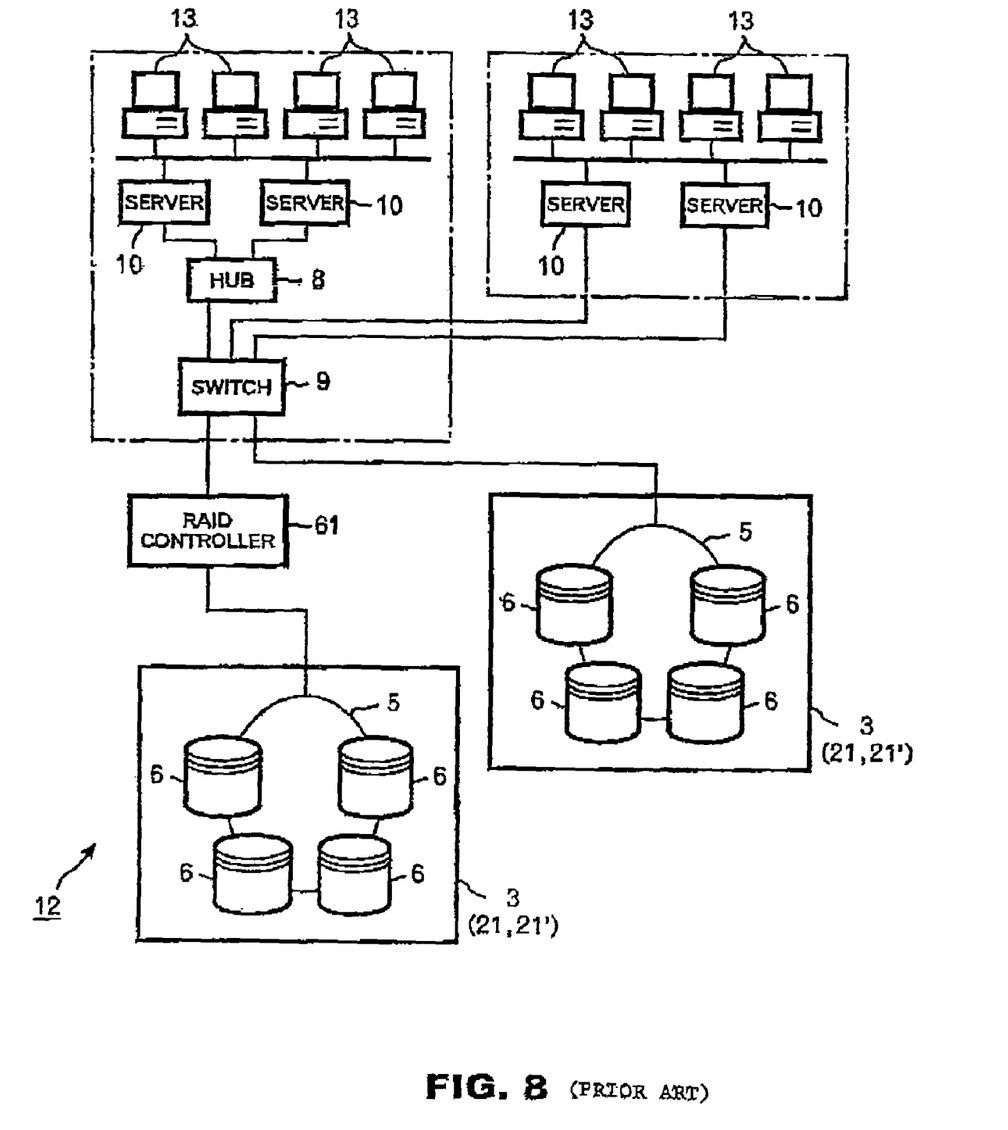
FIG. 8 is a diagram showing the overall configuration of a network system in which a storage area network is used.

The data storage system 1 can realize large storage capacity by incorporating a plurality of such disk enclosures 3. Employing the FC-AL 5, the data storage system 1 can realize a high data transfer rate and thereby allows high-speed access. Further, as shown in FIG. 8, a storage area network 12 can be formed by connecting, as servers 10, the host systems 2 to the disk enclosure 3 and a RAID controller 61 through a hub 8 and a switch 9. In this manner, local area networks each of which is formed by the servers 10 and terminals 13 can be separated from a storage network to and from which the servers 10 write and read data, whereby the network traffic can be made more efficient and a plurality of servers are allowed to share the storage.

Figure 9:
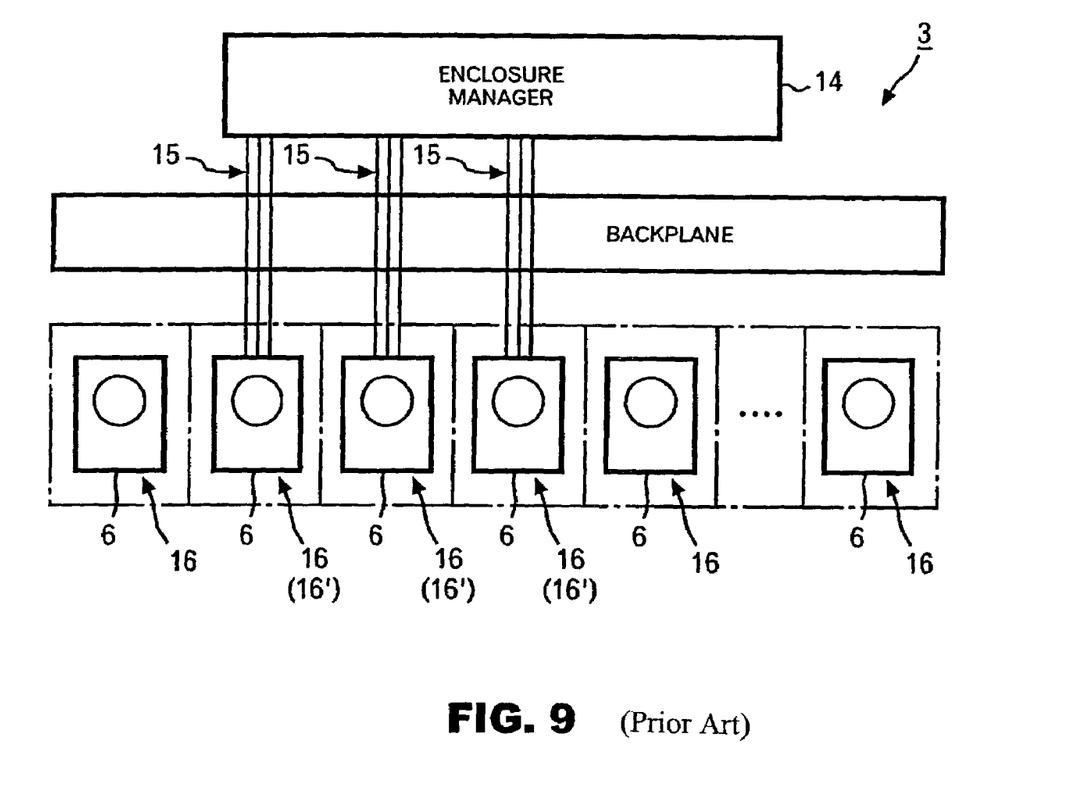
FIG. 9 is a block diagram schematically showing the main part of the conventional disk enclosure.

As shown in FIG. 7, in the data storage system 1, each disk enclosure 3 is provided with an enclosure manager 14. For example, as schematically shown in FIG. 9, the enclosure manager 14 is connected to predetermined HDDs 6 of the disk enclosure 3 through a parallel ESI (Enclosure Service Interface) buses 15 and can communicate with the host system 2 through a controller of the HDD 6 using SCSI (Small Computer System Interface) commands, specifically, SCSI enclosure service commands (SES commands).

The enclosure manager 14 responds to a request (SES command) from the host system 2 to send internal temperature of the disk enclosure 3, failure location therein, and other control and management information to the host system 2 through the controller of the HDD 6 and the FC-AL 5, and control the disk enclosure 3 properly through internal loop control and other control for the disk enclosure 3.

However, the data storage system 1 using such disk enclosures 3 has the following problems. The data storage system 1 employs the parallel ESI bus 15 for communication of plural kinds of data between the enclosure manager 14 and the HDDs 6. Since the ESI scheme defines peer-to-peer communications, it is necessary to provide the parallel ESI bus 15 between the enclosure manager 14 and every HDD 6 to enable communications between the enclosure manager 14 and the plural HDDs 6 according to the ESI scheme. This necessitates providing many signal lines between the enclosure manager 14 and the HDDs 6, which is virtually impossible. Therefore, among the disk slots 16 (see FIG. 9) to which the HDDs 6 can be attached in the disk enclosure 3, two or three particular slots are generally defined as such disk slots 16' that the HDD 6 attached thereto can be connected to the parallel ESI bus 15. However, in this case, if the HDDs 6 are not attached to the particular disk slots 16', the disk enclosure 3 cannot be controlled or managed according to the ESI scheme, which makes it difficult to perform data management properly. Further, to control and manage the disk enclosure 3 properly, it is necessary to instruct a user to have the ESI-supporting disk slots 16' always mounted with HDDs 6, which would cause inconvenience to the user.

SUMMARY OF THE INVENTION

The present invention has been made to solve the above technical problems, and an object of the invention is to make it possible to control and manage a disk enclosure properly without causing inconvenience to a user.

To achieve the above object, the invention provides a disk enclosure comprising a disk storage for storing data, an enclosure manager for outputting control and management information for the disk enclosure in response to a request of a host system, and a converter for outputting control and management information outputted from the disk storage as a parallel signal to the enclosure manager after serial conversion, and outputting control and management information outputted from the enclosure manager as a serial signal to the disk storage after parallel conversion.

With this configuration, it is possible to perform input/output on the enclosure manager by merely connecting the converter to the disk enclosure through a serial bus. In this case, merely providing a single serial port in the enclosure manager allows connection to a plurality of converters. Therefore, it is not necessary to provide a plurality of parallel ports in the enclosure manager for the purpose of giving it a function of sending and receiving control and management information to and from all the disk storages.

Therefore, it is desirable that the disk storage outputs the control and management information to the converter through a parallel ESI bus and that the converter output serialized control and management information to the enclosure manager through the serial bus.

If the disk enclosure includes a plurality of disk storages, converters are connected to the respective disk storages, and the converters are connected to the enclosure manager through the serial bus, control and management information relating to the disk enclosure can be inputted through any one of the disk storages.

In this case, it is preferable that the disk storage is a hard disk drive (HDD). It is also preferable that the control and management information is exchanged between the host system and the enclosure manager through the disk storage in the form of the SCSI enclosure service command.

In the case where the disk storage is an HDD, the disk enclosure according to the invention includes disk slots to which HDDs can be attached, respectively, and an enclosure manager for exchanging control and management information relating to the disk enclosure with a host system through the HDDs attached to the disk slots. Each disk slot has an ESI port that can be connected to a parallel ESI port provided in the attached HDD, and the ESI port is connected to the enclosure manager through a serial/parallel converter.

With this configuration, as far as an HDD is attached to any one of the disk slots, control and management information relating to the disk enclosure can be sent to the enclosure manager through that HDD.

Therefore, in this case, it is preferable that the disk enclosure are provided with a plurality of disk slots, a serial/parallel converter is provided for each disk slot, and each serial/parallel converter is connected to the enclosure manager through a serial bus.

The invention can also be recognized as a disk enclosure comprising an HDD for storing data, an enclosure manager for sending and receiving control and management information for the disk enclosure to and from a host system through the HDD, and means for connecting the HDD with the enclosure manager, wherein the enclosure manager sends and receives serialized signals of the control and management information in the ESI form to and from the HDD through the connecting means.

The connecting means may comprise a parallel ESI bus connected to the HDD, a serial/parallel converter connected to the HDD through the parallel ESI bus, and a serial bus connecting the serial/parallel converter and the enclosure manager, so that a serialized ESI control and management information outputted from the HDD can be inputted to the enclosure manager.

The HDD may include a serial/parallel converter for serializing ESI control and management information for the HDD, and the connecting means may be a serial bus connecting the serial/parallel converter and said enclosure manager.

The invention can also be recognized as a disk enclosure comprising a disk storage constituting a data storage system, and an enclosure manager for sending and receiving control and management information for the disk enclosure to and from a host system through the disk storage, wherein the disk storage sends and receives the control and management information and ID information unique to the disk storage in a serial form to and from the enclosure manager.

Since the ID information unique to the communicating disk storage is included in the communication between the disk storage and the enclosure manager in addition to the control and management information for the disk enclosure, the enclosure manager can communicate with the host system through a proper disk storage. In this case, the data storage system may include an FC-AL, and the ID information may be a loop ID in the FC-AL.

The invention can also be recognized as a disk storage accommodated in a disk enclosure provided with an enclosure manager for exchanging control and management information with a host system, which comprises a disk storage unit for storing data, a disk control unit for controlling operations of the disk storage unit, a first port for connecting the disk control unit with the host system in a parallel form, and a second port for connecting the disk control unit with the enclosure manager in a serial form, wherein the control and management information is exchanged between the host system and the enclosure manager through the first port, disk control unit, and second port.

The first port may be an FC-AL port and the second port may be a serial/parallel converter connected to the disk control unit. The serial/parallel converter serializes control and management information (SES command) in parallel form received from the host system through the first port and sends it to the enclosure manager, and parallelizes control and management information in serial form received from the enclosure manager and sends it to the disk control unit.

The disk control unit may include, as a third port, a parallel port for exchanging the control and management information with the enclosure manager in the parallel form.

DETAILED DESCRIPTION OF THE PRESENT INVENTION

The present invention will next be described in detail with reference to the embodiments illustrated in the accompanying drawings. In the embodiments, components common to the above-described prior art will be given the same reference symbols as in the prior art and will not be described.

Figure 1:
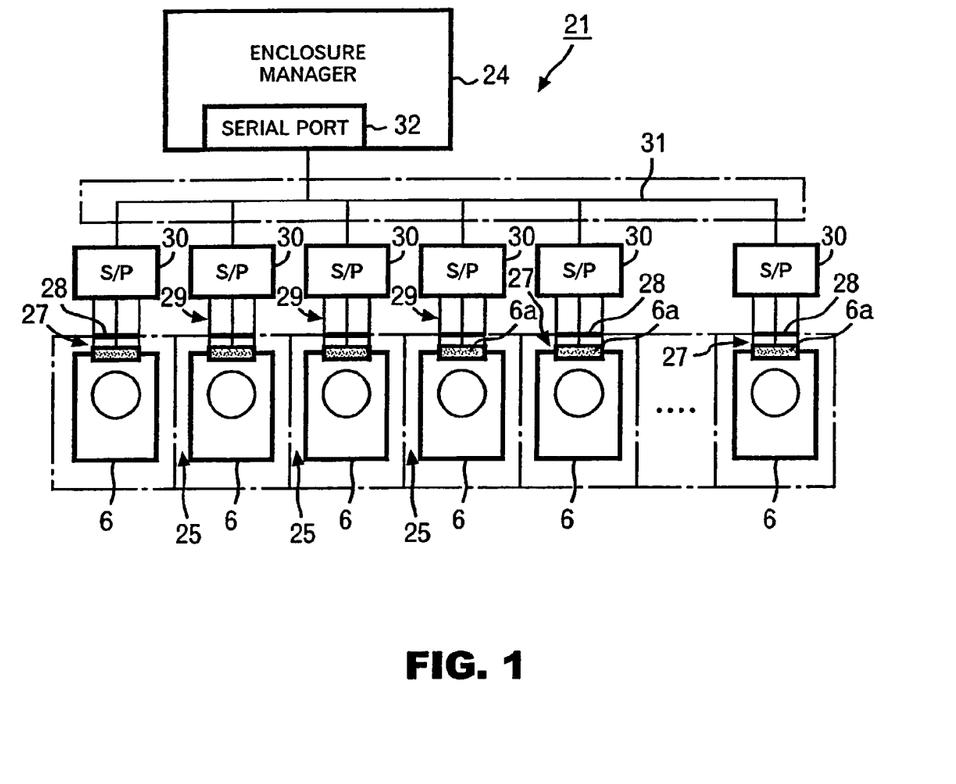
FIG. 1 is a block diagram schematically showing the main part of a disk enclosure according to an embodiment of the present invention.
Figure 2:
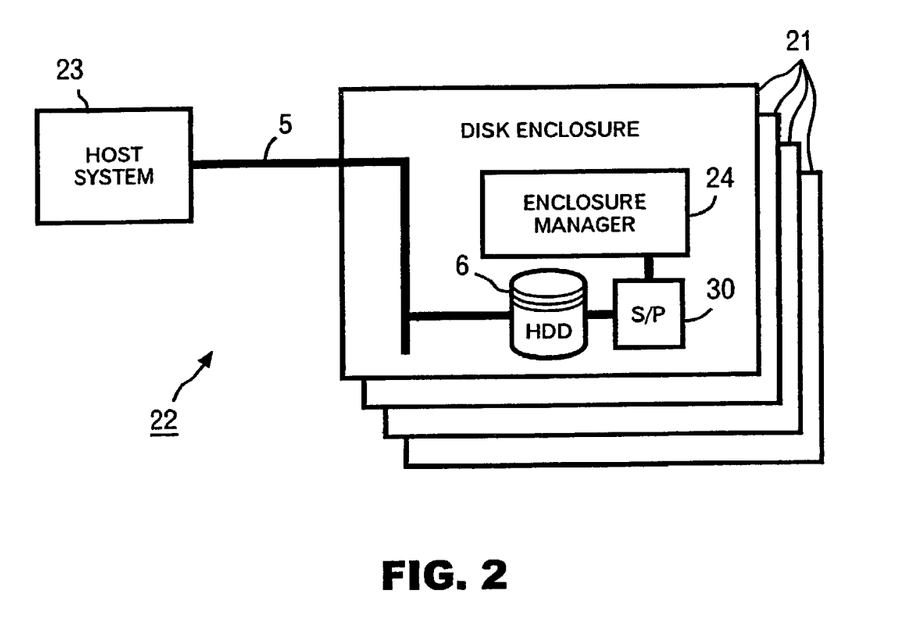
FIG. 2 is a diagram showing the overall configuration of a data storage system including the disk enclosure of FIG. 1.

FIG. 1 shows the configuration of the main part of a disk enclosure 21 according to the embodiment. FIG. 2 shows the overall configuration of a data storage system 22 using the disk enclosure 21 of FIG. 1.

The data storage system 22 shown in FIG. 2 includes a host system 23, an FC-AL 5 connected to the host system 23, and a plurality of disk enclosures 21. Data are written to and read from HDDs 6 of each disk enclosure 21 through the FC-AL 5. Large storage capacity can be realized by a plurality of HDDs 6. Further, a storage area network 12 may be formed as shown in FIG. 8 in such a manner that host systems 23 of the data storage system 22 are connected, as servers 10, to a hub 8 or a switch 9, and a disk enclosure 21 and a RAID controller 61 having a disk enclosure 21 as a subsystem are connected to the switch 9, so that the storage system can be shared by a plurality of servers.

As shown in FIG. 1, each disk enclosure 21 is provided with an enclosure manager 24 and a plurality of HDDs 6 (for the sake of simplicity, only one HDD 6 is shown in FIG. 2). The enclosure manager 24 is connected to the HDDs 6, and responds to a request from the host system 23 to send control and management information for the disk enclosure 21 to the host system 23 and control the inside of the disk enclosure 21.

Also, as shown in FIG. 1, the disk enclosure 21 is provided with disk slots 25 to which a plurality of HDDs 6 can be attached, respectively. Each HDD 6 is provided with a processor unit 6a that controls the operation of that HDD 6, an FC-AL port (not shown) for connection to the FC-AL 5, and a parallel ESI port 27 for exchanging signals that comply with the ESI scheme as a standard that allows the enclosure manager 24 to exchange control and management information such as internal temperature of the enclosure 21 and failure location therein with the host system 23 through the HDD 6. Each disk slot 25 is provided with a connector 28 that can be connected to the parallel ESI port 27. A serial/parallel converter (hereinafter referred to as S/P converter) 30 is connected to each connector 28 through the parallel ESI bus 29, and each S/P converter 30 is connected to a serial port 32 of the enclosure manager 24 through a serial bus 31.

Next, the operation for managing and controlling the disk enclosure 21 using SES commands that are outputted from the host system 23 will be described. When the host system 23 manages and controls the disk enclosure 21 using SES commands, the host system 23 first sends a management/control request (SES command) to an HDD 6 through the FC-AL 5. The HDD 6 outputs, as an ESI signal, the received SES command from the parallel ESI port 27 to the S/P converter 30 according to the ESI standard. The S/P converter 30 adds ED information of the corresponding HDD 6 to the received ESI signal and sends a resulting ESI signal to the enclosure manager 24 after serialization.

Figure 3:
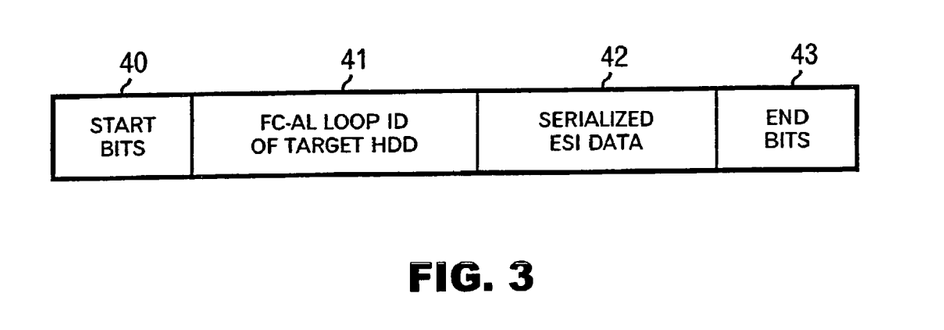
FIG. 3 shows a format of a serial ESI signal that is sent in the disk enclosure of FIG. 1.

FIG. 3 shows a data format of the serial ESI signal. According to the format shown in the figure, this signal includes start bits 40 followed by data 41 relating to a loop ID of the HDD 6 (target HDD) in the FC-AL 5, which has outputted the EST signal, serialized ESI data 42, and end bits 43.

The enclosure manager 24 controls internal circuits of the disk enclosure 21 based on the content of the SES command that has been received as the serial ESI signal. Further, in response to a request in the SES command, the enclosure manager 24 sends, from the serial port 32 to all the S/P converters 30, management information such as an internal temperature of the disk enclosure 21 and failure location therein in the form of a serial ESI signal in which the ID of the HDD 6 that has sent the SES command is added. Each S/P converter 30 extracts the ID of the received serial EST signal. If the extracted ID coincides with the ID of the corresponding HDD 6, the S/P converter 30 outputs the management information to that HDD 6 in the form of a parallel ESI signal. The HDD 6 sends the parallel ESI signal received from the S/P converter 30 from FC-AL port to the host system 23 through the FC-AL 5 as an SES command.

As described above, according to this embodiment, the disk enclosure 21 is provided with the HDDs 6, the enclosure manager 24 that sends and receives control and management information relating to the disk enclosure 21 to and from the host system 23 through the HDD 6, and the S/P converters 30 each of which converts a parallel ESI signal coming from the HDD 6 into a serial ESI signal and sends it to the enclosure manager 24 and that converts a serial ESI signal coming from the enclosure manager 24 into a parallel ESI signal and sends it to the HDD 6.

That is, in the disk enclosure 21, control and management information for the disk enclosure 21 to be exchanged between the host system 23 and the enclosure manager 24 is exchanged in the form of a parallel ESI signal between an HDD 6 and an S/P converter 30 through the parallel ESI port 27 of the HDD 6, the connector 28 and the parallel ESI bus 29, and in the form of a serial ESI signal between the S/P converter 30 and the enclosure manager 24 through the serial bus 31. Therefore, merely providing the single serial port 32 in the enclosure manager 24 makes it possible to control and manage the disk enclosure 21 according to the ESI scheme even if an HDD 6 is attached to any one of the disk slots 25.

This allows ESI scheme control without the need for connecting a plurality of disk slots 25 and the enclosure manager 24 by parallel ESI buses and for instructing a user to have particular disk slots 25 always mounted with HDDs 6. Thereby, it is possible to realize not only simplification of device configuration but also easiness of use for the user.

In this embodiment, the serial ESI signal to be supplied to the enclosure manager 24 contains, in addition to the serialized ESI signal, ID information indicating an FC-AL 5 loop ID of an HDD 6 that has outputted the ESI signal. Therefore, for example, when the enclosure manager 24 sends data to the host system 23 through an HDD 6, it sends the data to all the S/P converters 30. However, the S/P converters 30 other than the one corresponding to the HDD 6 specified by the ID discard the received data and do not send the data to the HDDs 6, so that there do not occur problems as would otherwise be caused by the enclosure manager 24 ' being connected to a lot of HDDs 6.

The above embodiment may be modified without departing from the spirit and scope of the invention. For example, the format shown in FIG. 3 may be the one commonly used in serial communications of personal computers as long as it contains the 10 ID information and ESI data.

Figure 4:
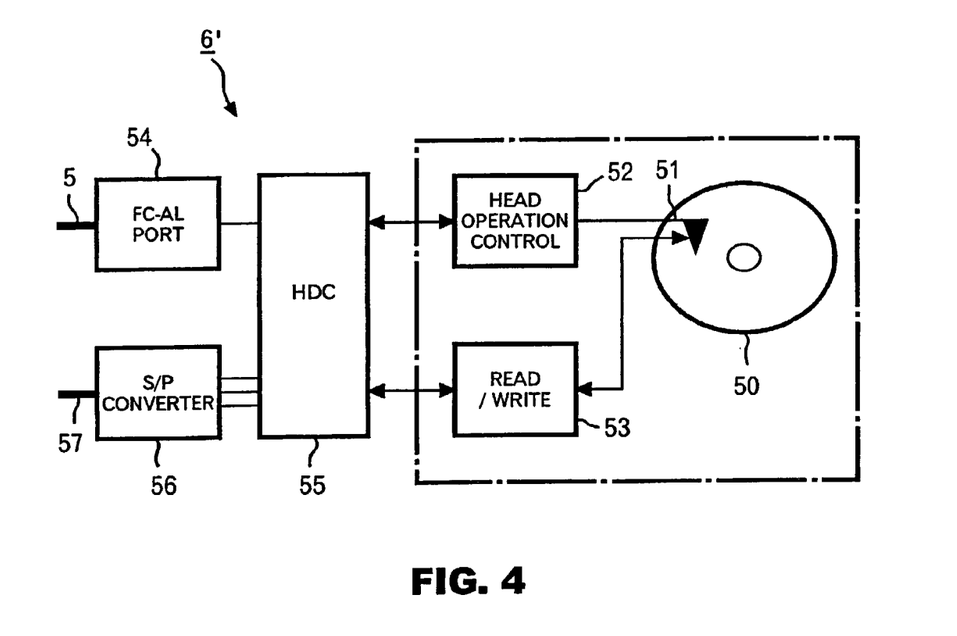
FIG. 4 is a diagram showing the overall configuration of an HDD according to another embodiment of the invention.

Also, while the S/P converters 30 are provided in the respective disk slots 25 in the above embodiment, the invention is not limited thereto, and, as shown in FIG. 4, an HDD 6' incorporating an S/P converter 56 may be employed. In the example shown in FIG. 4, the HDD 6' is provided with a magnetic disk (disk storage unit) 50, a magnetic head (disk storage unit) 51, a head operation control unit (disk storage unit) 52 for controlling the operation of the magnetic head 51, a read/write unit (disk storage unit) 53 for reading and writing data using the magnetic head 51, a hard disk controller (HDC; disk control unit) 55 for controlling the head operation control unit 52 and read/write unit 53, and an FC-AL port (first port) 54 for connecting the HDD 6' to the FC-AL 5. Further, an S/P converter (second port) 56 is connected to the HDC 55. The HDC 55 sends an SES command received from the FC-AL port 54 to the S/P converter 56 in the form of a parallel ESI signal. The S/P converter 56 converts the received parallel ESI signal into serial data having a format as shown in FIG. 3, and outputs the serial data to a serial bus 57 in the form of a serial ESI signal. Further, the S/P converter 56 converts a serial ESI signal received from the serial bus 57 into a parallel ESI signal according to the ESI standard, and outputs it to the HDC 55. The HDC 55 outputs the received parallel ESI signal to the FC-AL 5 as an SES command through the FC-AL port 54.

Figure 5:
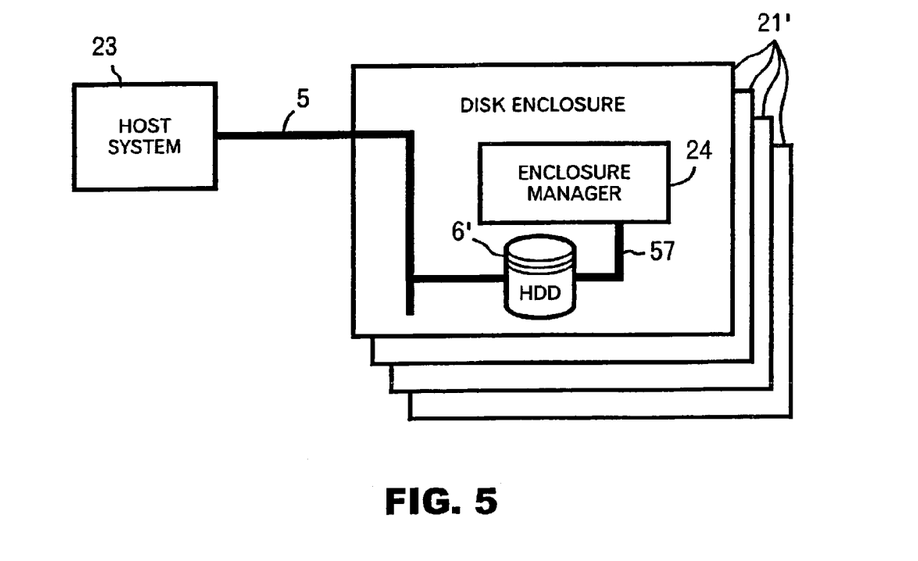
FIG. 5 is a diagram showing the overall configuration of a data storage system including a disk enclosure in which HDDs of FIG. 4 are used.

In this case, the overall configuration of a data storage system is as shown in FIG. 5 in which this data storage system is configured in such a manner that the HDDs 6' and enclosure manager 24 of each disk enclosure 21' are connected to each other simply by the serial bus 57. The disk enclosures 21' are controlled and managed by exchanging control and management information between the host system 23 and the enclosure manager 24.

Figure 6:
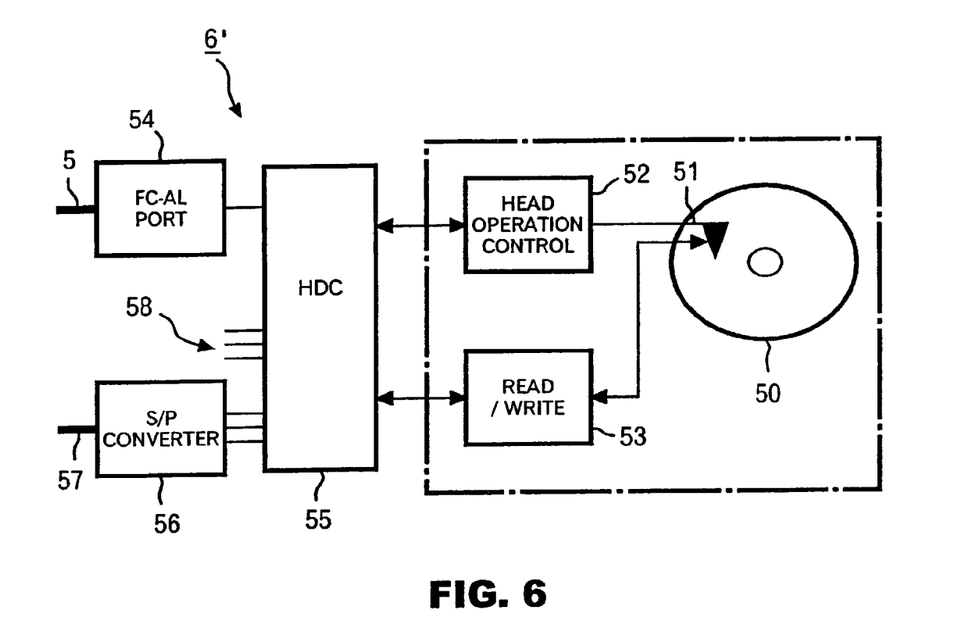
FIG. 6 is a diagram showing a modified example of the HDD shown in FIG. 4.

FIG. 6 schematically shows another modification. As shown in FIG. 6, a parallel ESI port (third port) 58 may additionally be connected to the HDC 55. This HDD 6' has higher versatility because it not only can realize the enclosure management function according to the ordinary ESI scheme using the parallel ESI port 58 but also is compatible with the disk enclosure 21' of such a type that the HDD 6' sends control and management information to the enclosure manager 24 through the serial bus 57.

In the modified embodiments shown in FIGS. 4 and 6, instead of using the S/P converter 56, the HDC 55 may incorporate a serial port (second port; not shown) therein. In this case, an SES command coming from the FC-AL port 54 is directly converted, in the HDC 55, into a serial ESI signal, which is outputted to the serial bus 57. A serial ESI signal received from the serial bus 57 is converted, in the HDC 55, into a parallel SES command, which is outputted to the FC-AL 5 through the FC-AL port 54. This HDD 6' can not only realize the S/P converter function without using the S/P converter 56 shown in FIG. 4 or 6, but also simplify the device configuration.

The disk enclosures 21, 21' according to the above embodiments can be applied to the storage area network 12 shown in FIG. 8. In the storage area network 12, the disk enclosures 21, 21' can exchange SES commands with a server 10 as a host system if directly connected to the switch 9. However, if the RAID controller 61 is provided in between, such direct exchange cannot be performed, and the RAID controller 61 receives an SES command from a server 10 and responds thereto. However, since the SES command itself is for the disk enclosures 21, 21', upon receiving the SES command from the server 10 the RAID controller 61 sends the SES command to each disk enclosure 21, 21' as required, and control and management information of each disk enclosure 21, 21' is returned to the RAID controller 61. The RAID controller 61 sends this information to the server 10 as required. Other modifications are possible without departing from the spirit and scope of the invention.

What is claimed is:

1. A disk enclosure, comprising:
a plurality of disk drives for storing data, wherein each one of said plurality of disk drives includes a parallel interface;
an enclosure manager having a serial port; and
a plurality of serial-to-parallel (S/P) converters, wherein each of said S/P converters is configured to couple a respective one of said plurality of disk drives to said serial port of said enclosure manager.

2. The disk enclosure of claim 1, wherein each of said plurality of S/P converters is connected to a respective one of said plurality of disk drives via a parallel Enclosure Service Interface bus.

3. The disk enclosure of claim 2, wherein each of said plurality of S/P converters is connected to said serial port of said enclosure manager via a serial bus.

4. The disk enclosure of claim 1, wherein said enclosure manager receives control and management information signals from a host system via said plurality of disk drives in the form of Small Computer System Interface enclosure service commands.

5. The disk enclosure of claim 4, wherein said host system sends said control and management information signals to said plurality of disk drives through a corresponding Fibre Channel-Arbitrated Loop.

6. The disk enclosure of claim 4, wherein said plurality of disk drives transmit Enclosure Service Interface signals to said S/P converters in response to the receipt of said control and management information signals.

7. The disk enclosure of claim 6, wherein said S/P converters add ID information and perform parallel-to-serial conversions on said control and management information signals, and transmit said converted control and management information signals to said enclosure manager.

8. A data processing system, comprising:
a host system; and
a plurality of disk enclosures coupled to said host system, wherein at least one of said plurality of disk enclosures includes
a plurality of disk drives for storing data, wherein each one of said plurality of disk drives includes a parallel interface;
an enclosure manager having a serial port; and
a plurality of serial-to-parallel (S/P) converters, wherein each of said S/P converters is configured to couple a respective one of said plurality of disk drives to said serial port of said enclosure manager.

9. The data processing system of claim 8, wherein each of said plurality of S/P converters is connected to a respective one of said plurality of disk drives via a parallel Enclosure Service Interface bus.

10. The data processing system of claim 9, wherein each of said plurality of S/P converters is connected to said serial port of said enclosure manager via a serial bus.

11. The data processing system of claim 8, wherein control and management information signals are exchanged between said enclosure manager and a host system via said plurality of disk drives in the form of Small Computer System Interface enclosure service commands.

12. The data processing system of claim 11, wherein said host system sends said control and management information signals to said plurality of disk drives through a corresponding Fibre Channel-Arbitrated Loop.

13. The data processing system of claim 11, wherein said plurality of disk drives transmit Enclosure Service Interface signals to said S/P converters in response to the receipt of said control and management information signals.

14. The data processing system of claim 13, wherein said S/P converters add ID information and perform parallel-to-serial conversions on said control and management information signals, and transmit said converted control and management information signals to said enclosure manager.

* * * * *